Sept. 20, 1971 L. E. PORTER Re. 27,170

UTILITY CARRIER FOR VEHICLES

Original Filed June 16, 1966 2 Sheets-Sheet 1

LESLIE E. PORTER
INVENTOR.

BY Allen M. Shapiro

ATTORNEY

UTILITY CARRIER FOR VEHICLES

Original Filed June 16, 1966 2 Sheets-Sheet 2

INVENTOR.
LESLIE E. PORTER
BY Allan M. Shapiro
ATTORNEY

United States Patent Office

Re. 27,170
Reissued Sept. 20, 1971

27,170
UTILITY CARRIER FOR VEHICLES

Leslie E. Porter, Oakdale, Calif., assignor of fractional part interest to Philip P. Pendergrass, Oakland, Calif.

Original No. 3,333,750, dated Aug. 1, 1967, Ser. No. 558,032, June 16, 1966. Application for reissue June 30, 1969, Ser. No. 870,174
Int. Cl. B60r 9/04
U.S. Cl. 224—29R 12 Claims

Matter enclosed in heavy brackets [ ] appears in the original patent but forms no part of this reissue specification; matter printed in italics indicates the additions made by reissue.

*ABSTRACT OF THE DISCLOSURE*

*A utility carrier for mounting equipment to be transported arranged to be mounted on the trunk lid of a vehicle and adapted to rotate about the hinge axis of the lid comprising a bottom section adapted to be secured directly on the trunk lid; a top section for mounting the equipment, the top section being hingeably coupled at one end thereof to the bottom section whereby the opposite end of the top section is pivotable between a stored position substantially adjacent the bottom section and an elevated position disposed at a substantial tilting angle with respect to the bottom section; and means extendable between the sections for releasably coupling the bottom section and the top section and for supporting the top section in its elevated position so that the trunk lid may be rotated in a manner to provide sufficient clearance between the equipment carried on the top section and portions of the vehicle.*

This invention relates to vehicular utility equipment carriers or racks and more particularly to a novel utility carrier adapted to be detachably mounted on the vehicle trunk lid for releasably supporting equipment in such a manner that ready access to the trunk interior may be had without removal of the equipment and without danger of the equipment encountering or striking portions of the vehicle when the trunk lid is raised.

It has been the conventional practice to transport such awkward sports equipment such as snow skis, water skis, toboggans, surf boards and the like on racks that are carried exteriorly of the vehicle while the sports enthusiast is travelling to and from a sporting area where the equipment is to be employed. Such equipment is relatively awkward to mount exteriorly on a vehicle, particularly if the vehicle is of the passenger type, inasmuch as the equipment is generally very long and not susceptible to being designed of a collapsible structure. Because of the awkwardness of such equipment, it is totally unfeasible to transport the equipment within the confines of the vehicle body unless the vehicle is a truck which will readily accommodate bulky and lengthy equipment. Even when a truck is employed for transportation purposes, the sporting equipment is relatively expensive and requires that a tie-down arrangement be used to avoid damaging the equipment during transport. Although the present invention may be employed to carry equipment such as that mentioned above, the following discussion of the present invention will be confined to the transportation of skis inasmuch as skiing equipment is representative of the sports equipment that may be suitably supported by the carrier of the present invention.

Basically, ski supports or tie-downs follow two basic designs; one design may be referred to as the "post and strap type which carries the skis on edge, held tightly to a metal post by a rubber strap that fits around the skis;

and the second form may be referred to as the "arm and clamp" type which carries skis at, sandwiched between two metal bars padded with rubber. Usually, each of these types may be accommodated so as to be mounted on the vehicle roof or on the trunk lid or deck. The usual trunk deck unit is the post and strap type which carries the skis angled skyward. The type which mounts on the roof is called a "roof rack." Furthermore, there is at least one arm and clamp arrangement type suitable for carrying skis horizontally across the rear deck.

Generally, all rear trunk deck racks or carriers are attached to the trunk lid with rubber suction discs and straps which hook onto the edges of the trunk lid. In some instances, permanent installations which bolt through holes drilled in the trunk lid are employed.

However, difficulties and problems have been encountered when employing utility carriers or racks of the conventional types which stem largely from the fact that, when the skis are mounted on a trunk deck so as to be angled in a skyward direction, accessibility to the trunk interior is impossible or at least extremely restricted. This is due in part because, as the trunk lid is raised, the extreme projecting ends of the skis will rotate downwardly and come into damaging contact with the roof or the top of the vehicle. This occurrence not only is damaging to the vehicle and the skis but so greatly limits access into the trunk interior as to render access thereto ineffective. In the event that it is necessary for the driver of the vehicle to remove such items as lunch boxes, tire chains, spare tires or equipment from the trunk interior, the driver must first remove the snow skis from the carrier and place the skis on the ground so that the trunk may be raised to permit sufficient clearance to effect removal of the articles desired. Obviously, such a procedure is extremely time consuming and bothersome. This problem has been avoided to some extent by mounting the skis horizontally across the rear deck; however, in such case, the ends of the skis extend beyond the sides of the vehicle so this represents an extremely dangerous situation and one which is to be avoided.

The problems and difficulties encountered with the conventional devices are obviated by the present invention which provides a top planar section that is hingeably connected at one end to a bottom planar section wherein the top section is employed for supporting the skis thereon while the bottom section is detachably secured to the trunk lid as by suction cups and straps. The top section is mounted on the bottom section by only hinge means at the rearward edge of the bottom section so that, when the top section is rotated upwardly from the bottom section, the top section assumes a sufficient tilt in an angular plane and attitude for assuring clearance of the projected ski ends above the vehicle roof as the trunk lid then is opened for access to the trunk interior, such clearance being assured even in those instances where an additional luggage rack is located on top of the roof. Brace means having a releasable latch mechanism is employed for supporting the top section and its mounted skis in its elevated or tilted position while the trunk lid is being raised. By increasing the tilting angle of the skis, a substantial area is gained between the top of the vehicle and the skis so that, upon raising of the trunk lid, full clearance into the opening of the trunk is available without causing the skis to engage with the roof top.

Therefore, it is a primary object of the present invention to provide a novel utility carrier or rack for vehicles of compact and economical construction particularly adapted for use on the trunk lid of a vehicle and that is adapted to avoid engagement of the equipment carried by the carrier with the roof of the vehicle when the trunk lid is raised for gaining access thereto.

It is another object of the present invention to provide a novel sports utility carrier detachably mounted on the trunk lid of a vehicle that includes a pivoted top portion for supporting the sports equipment in such a fashion that the sports equipment may be elevated to a desired tilting angle so that, when the trunk lid is raised, no interference is encountered between the skyward projecting end of the sports equipment and the top of the vehicle.

Still, it is another object of the present invention to provide a novel ski carrier that includes means for varying the tilting angle of the skis so as to provide maximum clearance into the interior of the trunk as the trunk lid is raised and which includes bracing means and latching mechanisms for supporting the skis in the desired tilting angle during the lid raising procedure.

Yet another object of the present invention is to provide a novel vehicle mounted carrier for skis or the like that is adapted to be detachably mounted on the rear deck of the vehicle so that the skis are mounted to extend at an angle skyward and which includes means for varying the angular disposition of the skis with respect to the vehicle roof.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
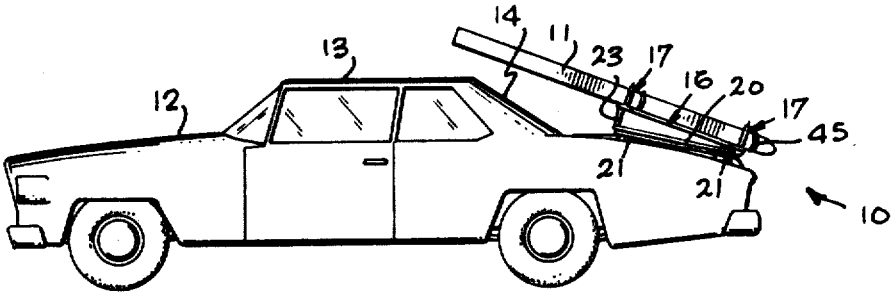
FIGURE 1 is a side elevational view of the novel utility carrier of the present invention and is shown supporting sports equipment such as skis on the trunk lid of a conventional motor vehicle.

Referring to FIGURE 1, the novel utility carrier of the present invention is illustrated in the direction of arrow 10 for supporting and carrying a plurality of skis, such as ski 11 on the rear deck or trunk lid of a conventional automobile 12. The vehicle as illustrated is of a standard passenger body type; however, is to be understood that the present invention has similar utility on vehicles of the sports body type such as compact or sports cars. The vehicle 12 is formed with a roof 13 having a rearwardly sloping portion 14 that leads to and terminates with a rear deck or trunk lid 15.

The utility carrier 10 comprises, in general, a top planar section 16 having upwardly projecting post and strap means 17 located in spaced relationship on its top side for detachably engaging and supporting the skis 11. The rear end of the top planar section 16 is mounted by a hinge means 18 to the rear end of a bottom planar section 20 that is mounted directly on the trunk lid via four flexible suction cups 21 arranged at the four corners of the bottom planar section. The carrier is further supported on the lid of the trunk by means of four straps 22 which are connected to the bottom planar section 20 at the locations of the suction cups 21 and to the edges of the trunk lid. To elevate the skyward projecting end of the skis 11 so as to avoid encounter with the top of the roof during transportation, the forward end of the bottom planar section 20 is provided with an upwardly projecting support 23 that extends between the opposite sides of the bottom planar section 20. The upwardly terminating end of the support 23 engages the bottom of the forward end of the top planar section 16.

Figure 2:
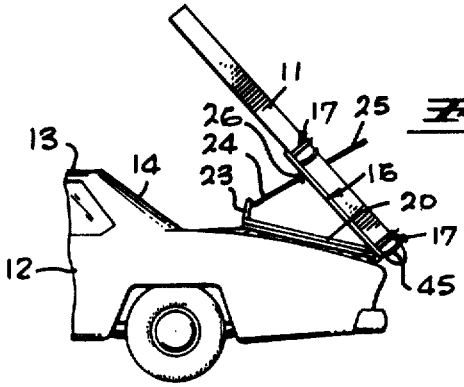
FIGURE 2 is a side elevational view of the utility carrier illustrating the elevated position of the carrier to a predetermined tilting angle and the skis supported thereon preparatory to opening of the vehicle trunk lid.

As illustrated in FIGURE 1, it is evident that should the trunk lid be raised so as to gain access to the interior of the vehicle trunk, the skyward projecting ends of the skis 11 would normally be depressed against the vehicle roof as the opposite ends of the skis are raised in following the pivoting action of the trunk lid. Referring now to FIGURE 2, it is to be noted that the utility carrier of the present invention includes a brace means 24 that is pivotally connected at one end of its length to the support 23 mid-way between its opposite lateral ends and that includes a free end 25 which selectively extends upwardly between the skis 11 and their supporting top section 16. The brace means 24 is slidably connected to the forward end of the top section 16 via a sliding latch mechanism 26 that latches the brace 24 to the top section 16 when the skyward projecting ends of the skis 11 are sufficiently elevated above the roof 13 so that the trunk lid may be raised. Inasmuch as the rearward ends of the top and bottom sections 16 and 20 are hinged together by means 18, the skis may be suitably elevated to the desired angle without the necessity for readjusting the skis on the top carrier and without removing or otherwise adjusting the support of the bottom section 20 on the trunk lid.

Figure 3:
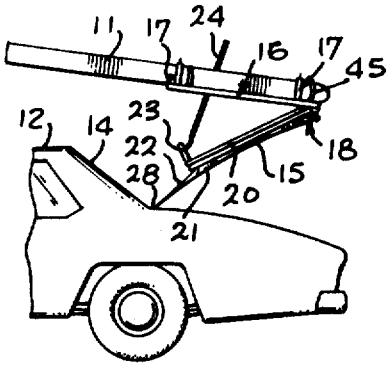
FIGURE 3 is a side elevational view of the utility carrier illustrating the position of the carrier and the skis when the vehicle trunk lid is fully opened.

Referring now to FIGURE 3, it can be seen that once the skis 11 have been elevated to the desired angular position as shown in FIGURE 2, the trunk lid 15 may be raised by pivoting the lid about its hinged connection 28 with the body of the vehicle 12. The skis 11 being fixedly supported on the top planar section 16, and the latter being fixedly supported on the bottom planar section 20 by the hingeable connection 18 and by the brace means 24, the skis, carrier 10 and the trunk lid form a unitary structure that moves about the hinge axis 28. It is to be particularly noted that ample clearance leading into the trunk interior is available and that any danger of the skis 11 coming into contact with the roof of the vehicle is avoided in accordance with the objectives of the present invention.

Figure 4:
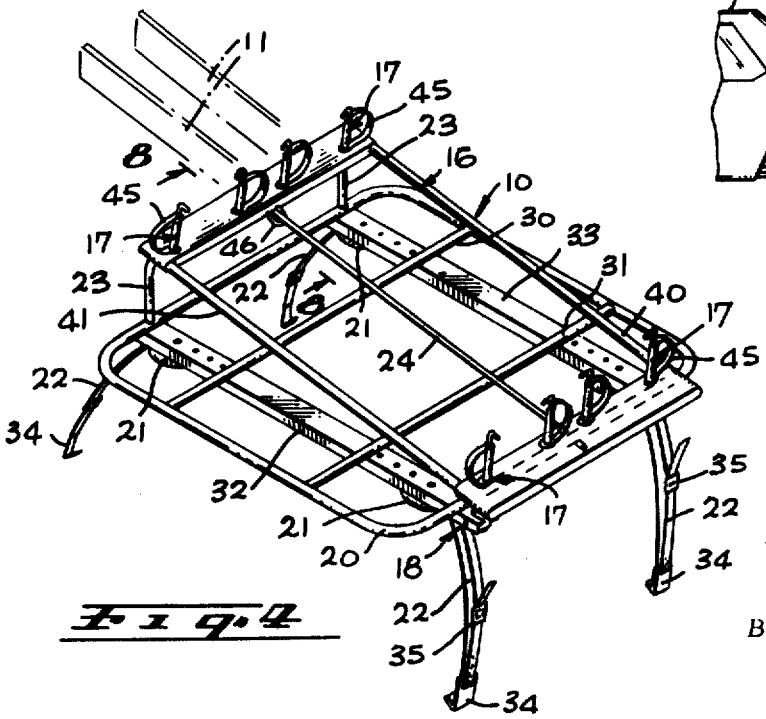
FIGURE 4 is an enlarged perspective view of the utility carrier employed in connection with the vehicle of FIGURE 1, a plurality of skis being shown in phantom lines as attached to the carrier.

Referring now to FIGURE 4, it can be seen that the bottom planar section 20 comprises a continuous tubular frame having a central opening over which a pair of parallel spaced apart elements 30 and 31 are disposed. The opposite ends of the elements 30 and 31 are secured to the opposite sides of the frame so that the bottom section 20 is reinforced thereby. The frame of the bottom section 20 is secured such as by welding, for example, to a pair of channel members 32 and 33 that are arranged along the lateral sides of the frame in fixed spaced relationship with respect to each other which serve to support the frame on the trunk lid 15 via the plurality of suction cups 21. The suction cups are individually secured to the respective ends of the channel members 32 and 33 by any suitable means such as screws, bolts and so forth. The same fastening means for securing the plurality of suction cups to the channel may also be employed for securing one end of the strap means 22 so that the carrier 10 may be secured to the vehicle. Each strap means 22 includes a hook 34 suitable for placement about the peripheral edge of the trunk lid 15 and further includes adjustment means, such as a buckle 35, for taking up any strap slack.

The upright support 23 takes the form of a substantially U shaped member having its opposite ends securely fastened to the frame of the bottom section 20 at its forward end in close proximity to the ends of the channel members 32 and 33 respectively. Such a construction provides an elongated portion 36, as seen more clearly in FIGURE 6, for supporting the forward end of the top planar section 16.

Figure 11:
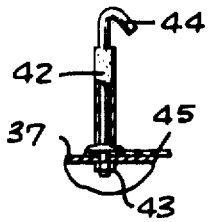
FIGURE 11 is a sectional view, partly in elevation, of a typical ski retainer employed in the carrier of the present invention as taken in the direction of line 11—11 of FIGURE 5.

The top planar section 16 includes a forward channel 37 and a rear channel 38 that defines the ends of the section 16 and which are communicated together at their opposite ends by means of tubular members 40 and 41 that are arranged in fixed spaced apart parallel relationship. Upwardly projecting from the forward and rear channels 37 and 38, there are arranged a plurality of post and strap fastening means 17 that are employed for detachably securing a plurality of skis onto the forward and rear channel members. Each means 16 includes an upright post 42, as shown more clearly in FIGURE 11, that is suitably secured to a channel member such as the forward channel 37 by a nut and thread arrangement 43. The post 42 further includes a hook portion 44 that is employed to detachably receive the free loop end of a strap 45. However, it is to be understood that other utility equipment fastening or retaining means may be employed than the specific post and strap arrangement as illustrated, such as when the equipment to be carried takes the form of a toboggan or a surfboard.

Figure 6:
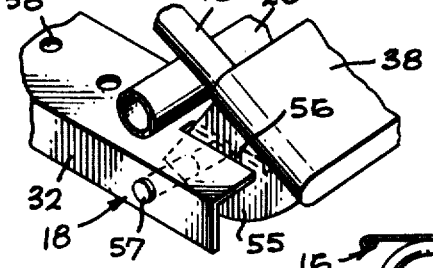
FIGURE 6 is a cross-sectional view of the carrier as taken in the direction of line 6—6 of FIGURE 5.

Referring now to FIGURES 4 and 6, it is to be noted that the forward channel 37 is provided with an eyelet 46 through which the brace means 24 projects. The eyelet is disposed mid-way between the opposite ends of the forward channel 37 and is disposed in such a manner that the brace means 24 is directed towards the rear of the carrier.

Figure 5:
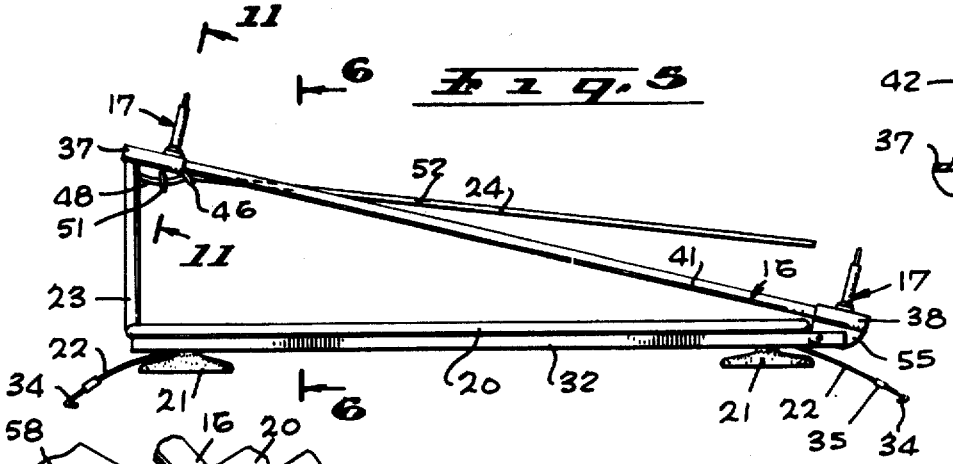
FIGURE 5 is a side elevational view of the carrier as illustrated in FIGURE 4.

The free end of the brace means 24 is illustrated as being releasably captured beneath the rear frame portion of the bottom section 20. The free end of the brace means may be seated within a groove or notch provided on the underside of the frame midway between its opposite ends so that, once the end of the brace means has been placed therein, the brace means will not have a tendency to float or project loosely about the carrier. As shown in FIGURE 5, the brace means 24 is in its free position and is not captured under the rear portion of the frame included in the bottom section 20.

Inasmuch as the hinge means 18 pivotally attaches the rear ends of the top bottom planar sections together, by capturing the free end of the brace means 24 the top planar section 16 is effectively releasably secured into the position as illustrated in FIGURE 4. The brace means is in effect cantilevered rearwardly from its pivotal connection with the forward channel 37 and is sufficiently flexible to be slightly bent over the eyelet 46 and slightly distorted to be seated within the groove provided on the rear frame of the bottom section 20. Therefore, the brace means operates as a tie-down means for suitably securing the top section 16 to the bottom section 20 while the vehicle is in motion and the trunk lid secured.

In FIGURE 6, the brace means 24 is shown having a portion rotatably mounted in a receptable 47 which permits the brace means to be pivoted therein so that the brace means may be employed to support the top section 16 in an elevated position. Furthermore, as more clearly illustrated in FIGURE 7, the brace means 24 includes a slight curve represented by the numeral 48, so that the latch mechanism of the brace means will not bind to the portion 36 when the top section 16 is raised.

Figure 9:
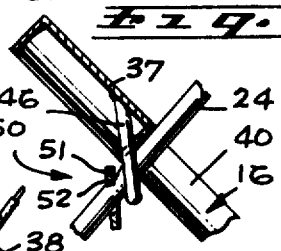
FIGURE 9 is an enlarged fragmentary view, partly in section, and of the same aspect as FIGURE 7, showing the brace in its latched condition to support the top planar section when elevated as in FIGURE 7.

Referring now to FIGURE 9, a releasable latch mechanism is illustrated in the direction of arrow 50 which includes a washer 51 slidably carried on the brace means 24 between the eyelet 46 and the receptacle 47. When it is desired to raise the top section 16, the forward end of the top section is moved upwardly so that the eyelet 46 slides over the brace means 24 and, when the top section has been elevated to a desired position, the washer 51 is slid on the brace means 24 until the washer 51 drops into a receptacle 52 formed in the brace means. The top section 16 is then supported by the bracing means inasmuch as the eyelet 46 will engage with one side of the washer 51 that is seated within the groove 52 of the brace means so that the top section 16 and the brace 24 are in releasably locked engagement.

Figure 8:
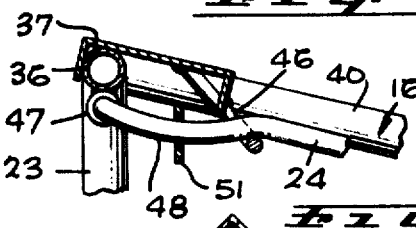
FIGURE 8 is an enlarged fragmentary view, partly in section, of the hinged brace slidably connecting the top and bottom planar sections together as taken in the direction of line 8—8 in FIGURE 4.

Referring now to FIGURE 8, the channel 37 is illustrated as being supported on the section 36 of the upright support 23 when the top section 16 is in its lowermost position. It is to be particularly noted that the washer 51 resides on the brace means 24 between the end of the brace means rotatably mounted in the receptacle 47 and the adjacent side of the eyelet 46.

Figure 10:
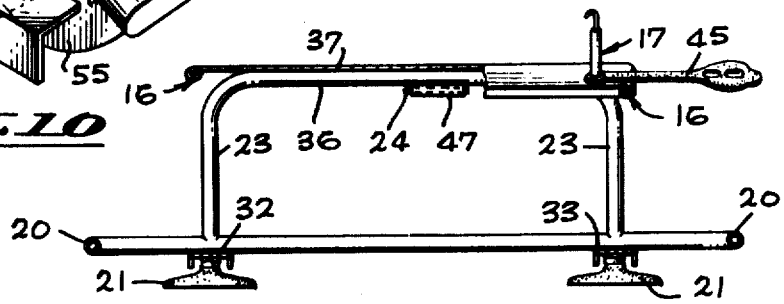
FIGURE 10 is an enlarged fragmentary perspective view of the pivot connection between the adjacent ends of the top and bottom planar sections.

Referring now to FIGURE 10, the hinge means 18 is illustrated as comprising a downwardly depending element 55 that is secured to the underside of each rearward corner of the top section 16 and which projects through a slot 56 formed in the extreme end of each channel member such as channel member 32. The element 55 is rotatably coupled to the end of the channel 32 via a fastener arrangement 57 which rotatably couples the end of top section 16 to the rear of bottom section 20. The frame to the bottom section 20 is suitably secured, such as by welding, to the top of the channels 32 and 33 so that the rear portion thereof is immediately below the top section 16 adjacent the hinge means 18 located on opposite sides of the carrier. The rearmost ends of the channels 32 and 33 are also provided with a plurality of holes, such as hole 58, for receiving the fasteners mounting one of the plurality of cushion means 21. Inasmuch as several holes are provided, the cushions can be suitably placed so as to accommodate the carrier 10 onto a variety of trung lids having varying sizes and configurations.

Figure 7:
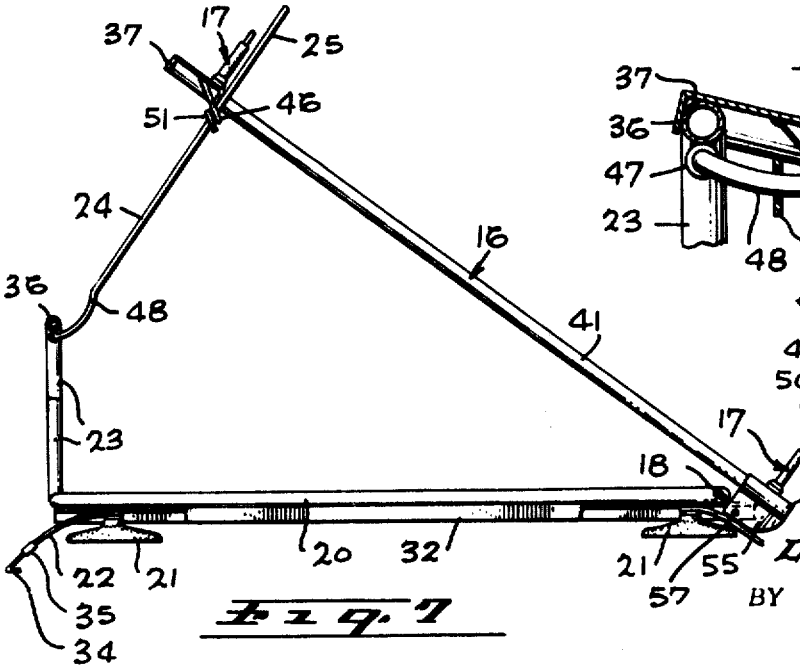
FIGURE 7 is a side elevational view of the carrier shown in FIGURE 4 illustrating the carrier in its raised or elevated angular position as in FIGURE 2.

Therefore, it can be seen from the foregoing that the apparatus of the present invention provides a novel utility carrier which may be readily mounted onto a trunk lid of conventional vehicles. When it is desired to gain access of the trunk interior, the free end of brace means 24 is released from beneath its captured position with the rear frame of the bottom section 20 and the top section 16 is pivoted about the hinge means 18 to elevate the forward portion thereof. When the top section carrying the skis has been elevated from the position as shown in FIGURE 1 to the position as shown in FIGURE 2, the latch means including washer 51 and eyelet 46 may be secured so that the forward portion of the top section is suitably supported by the brace means 24 such as is illustrated in FIGURE 7.

At this time, the trunk may be pivoted about its hinge axis 28 and the lid raised as illustrated in FIGURE 3 so that sufficient clearance is maintained between the skyward projecting ends of the skis 11 and the roof 13 of the vehicle 12. When the trunk lid is closed, the release mechanism including the washer 51 and eyelet 46 may be released so that the top section may be repositioned with its forward channel 37 seated on top of the upright support 23 and the brace means may be pivoted within the receptacle 47 so that the free end thereof may be flexed to be captured beneath the rear frame of the bottom section 20. In such a position, the top section is now suitably secured to the bottom section so that any drag incurred by the upwardly projecting ends of the skis will not cause the top section to pivot about its hinge connection 18 with the bottom section 20.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A utility carrier for mounting equipment to be transported arranged to be mounted on the trunk lid of a vehicle and adapted to rotate about the hinge axis of the lid comprising:

a bottom section [detachably mounted] *adapted to be secured directly* on the trunk lid;

a top section for mounting the equipment, *said top section being* hingeably coupled *at one end thereof* to said bottom section [and having] *whereby the opposite end of said top section is pivotable between* a stored position substantially adjacent said bottom section and an [elevation] *elevated* position disposed at a substantial tilting angle with respect to said bottom section; and means extendable between said sections for releasably coupling said bottom section and said top section *and* for supporting said top section in its elevated position so that the trunk lid may be rotated in a manner to provide sufficient clearance between the equipment carried on said top section and portions of the vehicle, *in its lowered stored load carrying position, the top section extends forwardly from its pivotal connection with the bottom section at the rear of the lid towards the pivotal axis of the trunk lid at the forward portion of the trunk.*

*2. A utility carrier for mounting equipment to be transported arranged to be mounted on the trunk lid of a vehicle and adapted to rotate about the hinge axis of the lid comprising:*

*a bottom section adapted to be secured directly on the trunk lid,*

*a top section for mounting the equipment, said top section being hingeably coupled at one end thereof to said bottom section whereby the opposite end of said top section is pivotable between a stored position substantially adjacent said bottom section and an elevated position disposed at a substantial tilting angle with respect to said bottom section, and*

*means extendable between said sections for releasably coupling said bottom section and said top section for supporting said top section in its elevated position so that the trunk lid may be rotated in a manner to provide sufficient clearance between the equipment carried on said top section and portions of the vehicle,*

*in its lowered stored load carrying position, the top section extends forwardly from its pivotal connection with the bottom section at the rear of the lid towards the pivotal axis of the trunk lid at the forward portion of the trunk,* [The invention as defined in claim 1 wherein]

said bottom planar section includes an upright support fixed to the forward end thereof for supporting the forward end of said top section and then said top section is in its stored position.

3. The invention as defined in claim 2 including hinge means cooperatively coupling the rear ends of said sections together to provide a hinge axis about which said top section may be selectively rotated upwardly.

4. The invention as defined in claim 3 whereby said extendable means includes a brace pivotally carried at one of its ends by the forward end of said bottom section and having its opposite end releasably engageable with the forward end of said top section.

5. The invention as defined in claim 4 including a releasable latch mechanism operably coupling said extendable means to said top section.

6. The invention as defined in claim 5 wherein said latch mechanism includes an eyelet secured on the forward end of said top section slidably embracing said brace and a washer slidably carried on said brace whereby the weight of said top planar section via said eyelet is applied against said washer to effectively cause said washer to bind on said brace.

7. The invention as defined in claim 6 wherein said extendable means is operable to releasably hold said top section in its stored position by engaging the rear portion of said bottom section.

8. The invention as defined in claim 7 wherein said top section includes a means for detachably coupling the equipment to be carried thereon.

9. The invention as defined in claim 8 including cushion means carried on said bottom section for mounting the carrier onto the trunk lid.

10. The invention as defined in claim 9 including strap means extending between the ends of said bottom section and the peripheral edge of the trunk lid.

*11. In a utility carrier for mounting equipment to be transported and adapted to be mounted on the trunk lid of a vehicle and move with the trunk lid about the hinge axis thereof,*

*a bottom section mounted on the trunk lid,*

*a top section for mounting the equipment, said top section being hingeably coupled at one end to said bottom section, whereby the opposite end of said top section is pivotable about an axis parallel to said hinge axis of said trunk lid between a stored position oriented at a relatively small angle with respect to said bottom section and an elevated position disposed at a substantial tilting angle with respect to said bottom section, and*

*means including an extendable element for releasably coupling said bottom section and said top section and for supporting said top section in its elevated position so that sufficient clearance is provided between the equipment carried on said top section and portions of the vehicle, in its lowered stored load carrying position, the top section extends forwardly from its pivotal connection with the bottom section at the rear of the lid towards the pivotal axis of the trunk lid at the forward portion of the trunk.*

*12. In an article carrying apparatus adapted to be mounted on a vehicle trunk lid that is movable between open and closed positions,*

*a first section adapted to be mounted on the vehicle trunk lid,*

*a second section adapted to operatively support an article and pivotally connected to said first section at one end thereof for movement between a stored position oriented at a relatively small angle with respect to said first section and an elevated position wherein the opposite end of said second section is spaced upwardly from said first section, and*

*means extendable between said first and second sections and adapted to support said opposite end of said second section in said elevated position, whereby to prevent any interference between an article carried by the apparatus and the vehicle when the trunk lid is moved between its respective closed and open positions, in its lowered stored load carrying position, the top section extends forwardly from its pivotal connection with the bottom section at the*

*rear of the lid towards the pivotal axis of the trunk lid a the forward portion of the trunk.*

References Cited

The following references, cited by the Examiner, are of record in the patented file of this patent or the original patent.

UNITED STATES PATENTS

| | | | |
|---|---|---|---|
| 2,220,292 | 11/1940 | Schmidt | 214—42.5X |
| 2,777,727 | 1/1957 | Reilly | 224—29X |
| 3,273,767 | 9/1966 | Moore | 224—42.08X |

FOREIGN PATENTS

| | | | |
|---|---|---|---|
| 303,500 | 2/1955 | Switzerland | 224—42.1E |
| 307,227 | 7/1955 | Switzerland | 224—42.1E |
| 360,144 | 6/1938 | Italy | 224—42.03 |
| 1,027,635 | 2/1953 | France | 224—42.1E |

ROBERT G. SHERIDAN, Primary Examiner

U.S. Cl. X.R.

224—42.1F

UNITED STATES PATENT OFFICE
CERTIFICATE OF CORRECTION

Patent No. Re. 27,170 Dated September 20, 1971

Inventor(s) Leslie E. Porter

It is certified that error appears in the above-identified patent and that said Letters Patent are hereby corrected as shown below:

Column 1, line 71, insert closed quotes after the word "strap".

Column 3, line 72, after "however," and before the word "is" insert --it--.

Column 5, line 28, "16" should be --17--.

Column 5, line 74, "receptable" should be --receptacle--.

Column 6, line 49, "trung" should be --trunk--.

Column 7, line 55, after "section" in second occurrence, insert --and--.

Column 7, line 65, change the "comma" to a --period--.

Column 7, lines 67-70, should be deleted. (Claim 2)

Column 9, line 2, "a" should be --at--.

Signed and sealed this 24th day of April 1973.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334